June 5, 1962 — J. E. COCHRAN — 3,037,671
FEED MIXING DEVICE
Filed Aug. 12, 1959 — 2 Sheets-Sheet 1

Inventor
James E. Cochran
by Donald H. Zarley
Attorney

Witness
Edward P. Seeley

Inventor
James E. Cochran
by Donald H. Zarley
Attorney

Witness
Edward P. Seeley

United States Patent Office 3,037,671
Patented June 5, 1962

3,037,671
FEED MIXING DEVICE
James E. Cochran, Rte. 2, Adel, Iowa
Filed Aug. 12, 1959, Ser. No. 833,248
5 Claims. (Cl. 222—142)

My invention relates to feed mixing and more particularly to a device that can mix different feed components in any desired proportions.

Animal feeding in the swine and cattle raising areas is a highly specialized endeavor because the feed components are continually varied to provide proper nourishment for animals of different size, weight and age. Grains such as corn and oats are usually the two primary ingredients of the feed mixture along with a third important component which is a protein supplement of commercial manufacture. The three ingredients are usually weighed and then mixed in their proper proportions, and then ground to a fine mixture in a hammer mill or the like.

Heretofore, the only accurate way to create feed mixtures of different component parts was to separately weigh each component to insure that it would be present in the mixture in its proper proportion. Obviously, the separate weighing operations of each feed component make feed mixing very time consuming. This is true even though attempts have been made to mechanize the weighing and mixing operations.

Therefore, the principal object of my invention is to provide a feed mixing device that can produce a feed mixture of predetermined component parts without the use of a weighing apparatus.

A further object of my invention is to provide a feed mixing device that can be easily operated to change the various proportions of the feed components.

A still further object of my invention is to provide a feed mixing device that will accurately deliver predetermined quantities of feed components to the feed mixture.

A still further object of my invention is to provide a feed mixing device that will not only deliver proper quantities of feed components but will also thoroughly mix the feed components.

A still further object of my invention is to provide a feed mixing device that can be adapted for use with most feed storage bins.

A still further object of my invention is to provide a feed mixing device that is economical of manufacture, durable in use and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Figure 1:
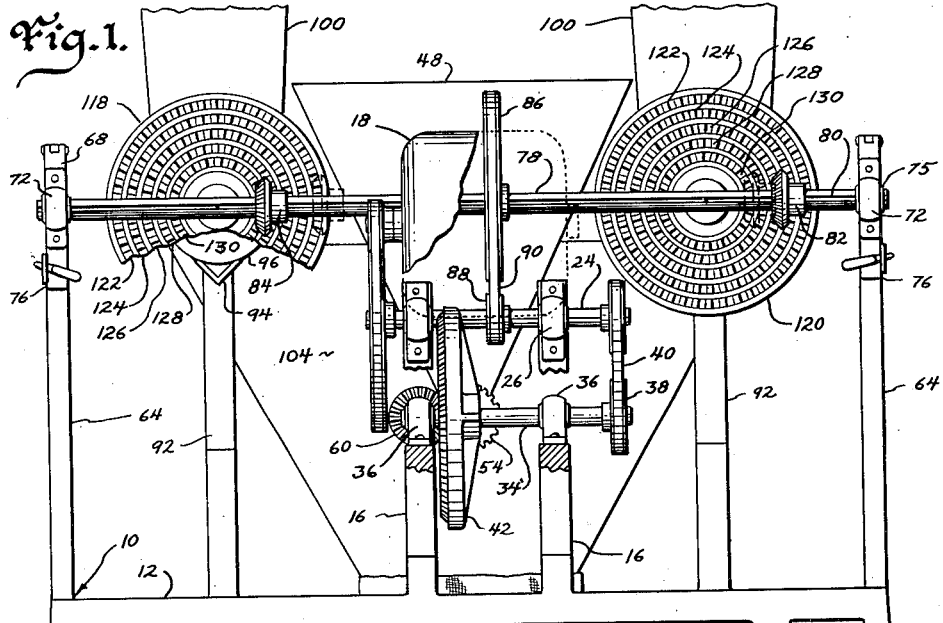
FIG. 1 is a frontal elevational view of my device with certain elements cut away to more fully show its construction.

I have used the numeral 10 to generally designate the frame of my device. Horizontal frame member 12 can be supported on a floor surface by legs 14 or can be otherwise supported from a ceiling or wall if so desired. A frame bracket 16 extends upwardly from frame member 12 and electric motor 18 can be bolted thereto in conventional manner. Motor 18 can be connected to a source of electricity with a conventional electric switch interposed therebetween. A horizontal power shaft 20 extends laterally from motor 18 and a small belt pulley 22 is rigidly secured thereto in conventional fashion.

An elongated horizontal shaft 24 is rotatably secured to frame bracket 16 by means of bearing members 26 in a position parallel to motor power shaft 20. A large belt pulley 28 is rigidly secured in conventional fashion to one end of shaft 24 and is in alignment with pulley 22 on the motor shaft 20. Endless belt 30 connects pulleys 22 and 28. A small belt pulley 32 is rigidly secured in conventional fashion to the other end of shaft 24.

A second elongated horizontal shaft 34 is rotatably secured to frame bracket 16 by means of bearing members 36 in a position parallel to and underneath shaft 24. A small belt pulley 38 is rigidly secured to one end of shaft 34 in conventional fashion and is in alignment with pulley 32 on shaft 24. Continuous belt 40 connects pulleys 32 and 38. A large gear 42 is slidably mounted on shaft 34 and is selectively, rigidly held to the shaft by set screw 44.

Figure 2:
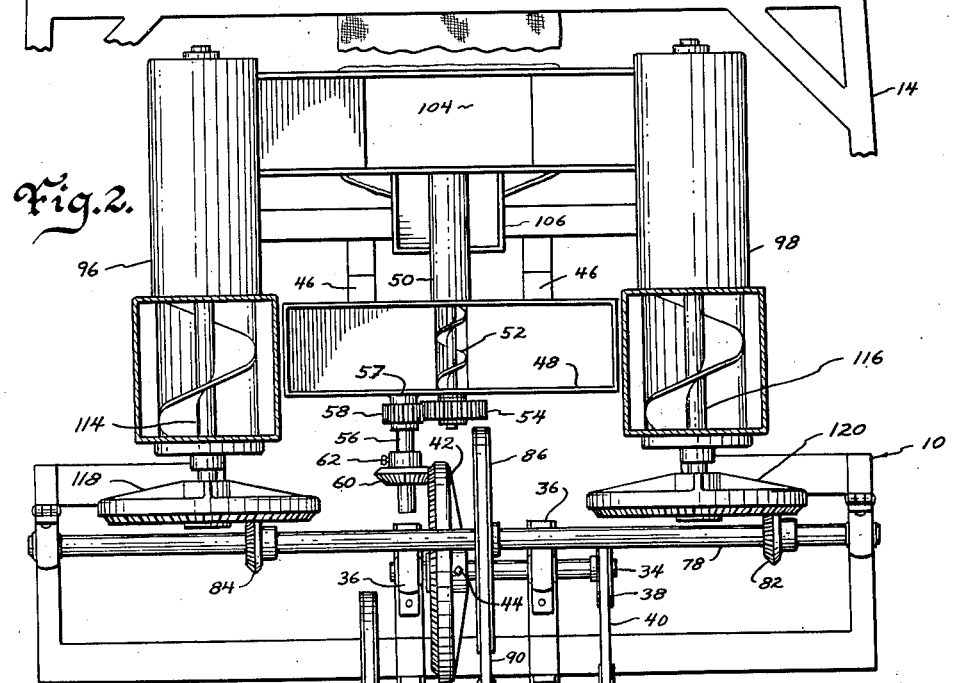
FIG. 2 is a top view of my device.

Vertical frame posts 46 are welded or otherwise secured to horizontal frame member 12. A V-shaped hopper 48 is welded or otherwise secured to posts 46 and a horizontal elongated cylindrical auger housing 50 is secured to the bottom of hopper 48. An auger shaft 52 is mounted in conventional fashion within auger housing 50 and as shown in FIG. 2, both the auger housing and auger shaft are in communication with the bottom interior of hopper 48. Auger shaft 52 and auger housing 50 are perpendicular to shaft 34 but are in the same horizontal plane therewith.

A gear 54 is rigidly secured in conventional fashion to the end of auger shaft 52 nearest shaft 34. A bearing member 57 is rigidly secured to hopper 48 by welding or the like and rotatably receives the end of shaft 56 which extends outwardly from the hopper in a direction parallel to auger shaft 52. A gear 58 is rigidly secured to shaft 56 in conventional fashion and is in mesh with gear 54 on the auger shaft 52. A spur gear 60 is slidably mounted on shaft 56 and is selectively rigidly held on the shaft by set screw 62. Large gear 42 on shaft 34 has rows of gear teeth concentrically disposed on one of its faces and spur gear 60 is adapted to be meshed with one of the rows of gear teeth on gear 42. The detailed structure of gear 42 will be discussed further in the description of similar gears on my device.

Frame posts 64 are welded or otherwise secured to frame member 12 and extend vertically upwardly therefrom. Hinges 66 are welded or otherwise secured to the upper portions of post 64 so that the hinge elements 68 can pivot in a vertical plane away from posts 64 about hinge pins 70. Conventional self-aligning shaft bearings 72 are secured to hinge elements 68 by bolts 74. Arcuate-shaped bushings 75 are movably mounted within the arcuate-shaped sockets (not shown) of bearings 72 so that the bushings are permitted at least some relative tipping movement within the bearings. A latch mechanism 76 is secured to posts 64 and hinge elements 68 to selectively hold the hinge elements 68 against the posts.

An elongated shaft 78 is mounted in and extends between the bushings 75 of bearing members 72. An elongated keyway slot 80 extends along the length of shaft 78. Spur gears 82 and 84 are slidably mounted on shaft 78 and each has an integrally cast key 85 which is slidably received in keyway slot 80. Because of the position of posts 64 on frame 10, shaft 78 extends parallel to shaft 24. Belt pulleys 86 and 88 are in alignment and are rigidly secured to shafts 78 and 24, respectively. Belt 90 connects pulleys 86 and 88.

Frame posts 92 extend vertically upwardly from frame member 12 and horizontal brackets 94 are welded to the tops thereof. Brackets 94 are perpendicular to shaft 78.

Figure 3:
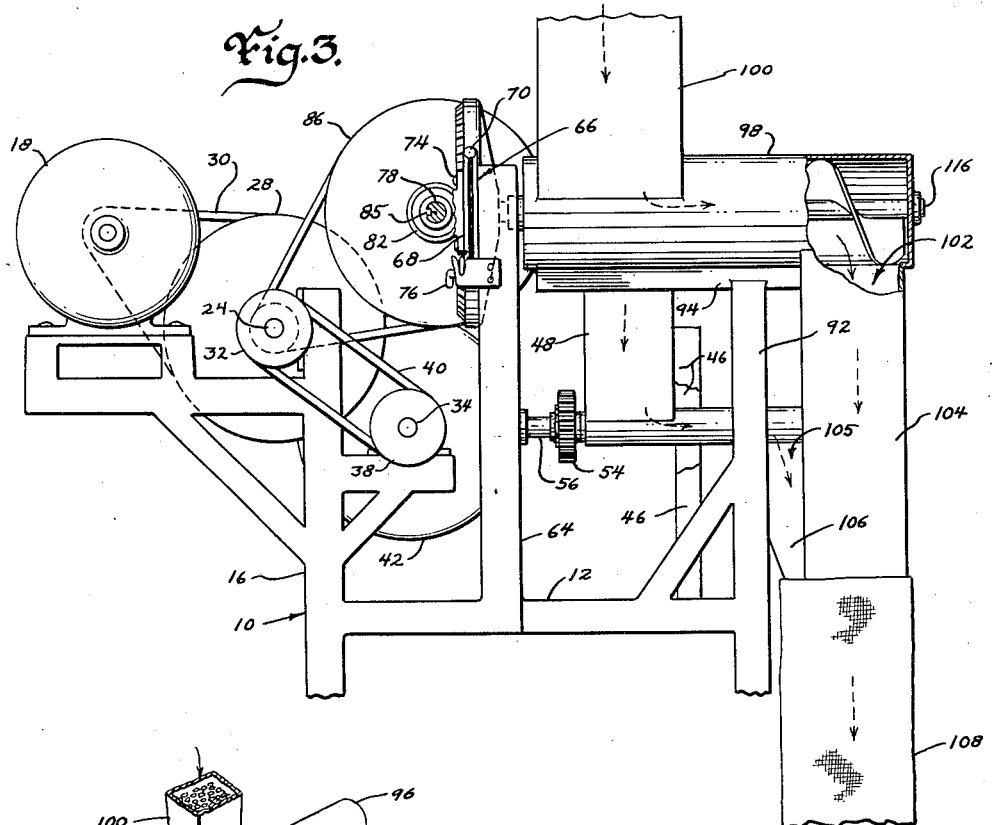
FIG. 3 is a schematic side view of my device.
Figure 5:
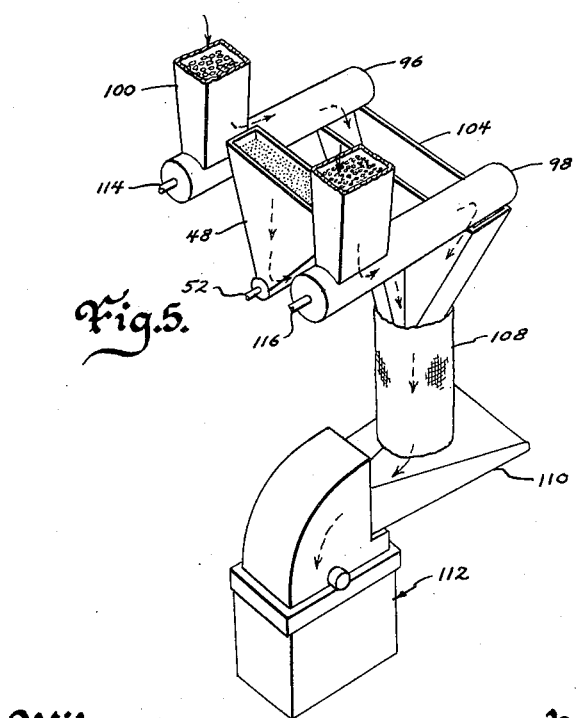
FIG. 5 is a perspective schematic view of my device showing the flow of feed components therethrough.

Auger housings 96 and 98 are welded or otherwise secured to brackets 94. Spouts 100 are secured to the upper portions of one end of auger housings 96 and 98 and are in communication with the interior of the housings. The bottom portions of the other ends of the auger housings 96 and 98 are open at 102 and are in communication with a downwardly extending chute 104 which is suspended from the ends of the housings in any convenient manner. An opening 105 appears in the lower end portion of auger housing 50, as shown in FIG. 3 and duct 106 connects housing 50 and chute 104. A flexible fabric material 108 may be secured about the bottom of chute 104 to contain the feed mixture as it falls into the hopper 110 of hammer mill 112.

Auger shafts 114 and 116 can be mounted in conventional fashion within auger housings 96 and 98, respectively. One end of shafts 114 and 116 projects from the ends of their respective housings and gears 118 and 120 are rigidly secured to the outer ends of the respective shafts. Gears 118 and 120 are similar to gear 42 on shaft 34. These gears have concentric rows of teeth 122, 124, 126, 128 and 130 on one of their faces. Spur gears 82 and 84 are adapted to mesh with one of the rows of teeth on gears 118 and 120, respectively.

The normal operation of my device is as follows: Motor 18 can move protein supplement out of the bottom of hopper 48 and into chute 104 by actuating the coupling mechanism comprised of pulley 22, belt 30, pulley 28, shaft 24, pulley 32, belt 40, shaft 34, gear 42, spur gear 60, shaft 56, gear 58 and gear 54 which will effect the rotation of auger shaft 52, which in turn will carry any protein supplement in the bottom of hopper 48 through auger housing 50, through opening 105, through duct 106 and into chute 104. The hopper 48 should obviously be filled with protein supplement or placed in communication with a source of this ingredient by spouting or the like.

Corn can be introduced into the spout 100 on auger housing 96 from an overhead bin or the like, and oats can be introduced into spout 100 on auger housing 98 in like manner. Obviously, the corn and oats in auger housings 96 and 98 are delivered to chute 104 by rotation of auger shafts 114 and 116, respectively. Motor 18 can rotate these two auger shafts through the actuation of shaft 24 in the manner described, which is further connected to the auger shafts by pulley 88, belt 90, pulley 86, shaft 78 and spur gears 82 and 84.

The rate of flow of oats, corn and protein through the respective auger housings and into chute 104 is controlled by the rotational speed of the respective auger shafts. Thus, if it is desired to slow down the flow of corn through auger housing 96, it is necessary to move spur gear 84 from its position adjacent inner row of teeth 130 on gear 118, for example, to an outer row of gear teeth 122, 124, 126, or 128. The dotted lines in FIG. 1 show alternate positions of spur gears 82 and 84 which may be assumed to alter the speed of the auger shafts to alter the flow of grain into chute 104. The rate of flow per unit of time for each row of teeth on gears 42, 118 and 120 can be determined by running feed separately through one auger housing at a time and weighing the resulting flow after a given operational period. Thus, it may be determined that when spur gears 82 and 84 mesh with row 130 of gears 120 and 118, respectively, 100 pounds of grain is delivered. Smaller valves would result from the other rows of teeth on the gears 118 and 120. Once the flow valves have been so computed, the operator will know exactly how many pounds of feed components flow from each auger housing for each row of teeth on gears 118, 120 and 42 within a given increment of time.

Figure 4:
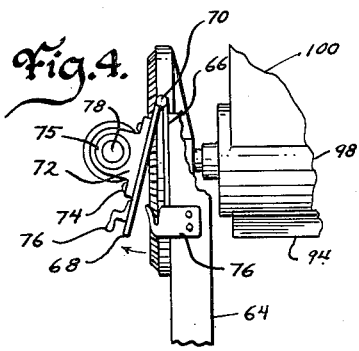
FIG. 4 is a detailed elevational view of the end of my auger control shaft.

As shown in FIG. 4, the operator may release the latch assembly 76 on post 64 and pivot hinge element 68 upwardly to disengage gear 82 from gear 120. Gear 82 can then be slidably moved to any desired position on shaft 78 and the integrally cast key 85 which prevents the gear from rotating on the shaft. The shaft 78 can have one of its ends pivoted with a hinge element 68 by virtue of the conventional self-aligning bearings 72. The closing of latch assembly 76 will hold spur gears 80 and 82 in mesh with gears 118 and 120, respectively.

By observing FIG. 2, it is seen that gear 60 can be disengaged from gear 42 by loosening set screw 44, sliding gear 42 to the right to disengage gear 60, loosening set screw 62, sliding gear 60 to the desired position on shaft 56, sliding gear 42 to the left to re-engage gear 60, and retightening set screw 44.

Thus, by knowing how much of a food component each auger will provide when the respective spur gears are set on a given row of teeth on gears 42, 118 and 120, the operator can easily and accurately determine just what proportions of feed components will be present in the final feed mixture falling down into chute 104 for delivery to the hammer mill 112.

From the foregoing, it is seen that my device will accomplish at least all of its stated objectives.

Some changes may be made in the construction and arrangement of my feed mixing device without departing from the real spirit and purpose of my invention, and it is my intention to cover by my claims, any modified forms of structure of use of mechanical equivalents which may be reasonably included within their scope.

I claim:

1. In a feed mixing device, a frame, at least two auger housings on said frame, auger shafts rotatably mounted within said auger housings with at least one of their ends extending therefrom, means on said auger housings for introducing feed components therein, a gear on the ends of said auger shafts outside said auger housings, said gears having a plurality of concentric rows of gear teeth, said gears being in lateral alignment with each other, hinge elements pivotally secured to said frame at points in substantial alignment with said gears; said hinge elements adapted to pivot in a vertical plane, shaft bearings on said hinge elements, an elongated shaft extending through said bearings and in front of said gears, spur gears on said shaft adapted to mesh with one of said rows of teeth on each of said gears, and a power means on said frame operatively connected to said shaft to impart rotational movement thereto.

2. In a feed mixing device, a frame, at least two auger housings on said frame, auger shafts rotatably mounted within said auger housings with at least one of their ends extending therefrom, means on said auger housings for introducing feed components therein, said auger housings being feed discharge openings, a chute connecting said feed discharge openings, a gear on the ends of said auger shafts outside said auger housings, said gears having a plurality of concentric rows of gear teeth, said gears being in lateral alignment with each other, hinge elements pivotally secured to said frame at points in substantial alignment with said gears; said hinge elements adapted to pivot in a vertical plane, shaft bearings on said hinge elements, an elongated shaft extending through said bearings and in front of said gears, spur gears on said shaft adapted to mesh with one of said rows of teeth on each of said gears, and a power means on said frame operatively connected to said shaft to impart rotational movement thereto.

3. In a feed mixing device, a frame, at least two auger housings on said frame, auger shafts rotatably mounted within said auger housings with at least one of their ends extending therefrom, means on said auger housings for introducing feed components therein, a gear on the ends of said auger shafts outside said auger housings, said gears having a plurality of concentric rows of gear teeth, said gears being in lateral alignment with each other, a shaft rotatably secured to said frame in substantial alignment with said gears, spur gears slidably mounted on said shaft and adapted to mesh with one of said rows of teeth on each of said gears, means on said frame for pivoting said shaft away from said gears at times, and a power means on said frame operatively connected to said shaft to impart rotational movement thereto.

4. In a feed mixing device, a frame, at least two auger housings on said frame, auger shafts rotatably mounted within said auger housings with at least one of their ends extending therefrom, means on said auger housings for introducing feed components therein, a gear on the ends of said auger shafts outside said auger housings, said gears having a plurality of concentric rows of gear teeth, said gears being in lateral alignment with each other, a shaft rotatably secured to said frame in substantial alignment with said gears, spur gears slidably mounted on said shaft and adapted to mesh with one of said rows of teeth on each of said gears, means on said frame for selectively pivoting said shaft away from either of said gears at times, and a power means on said frame operatively connected to said shaft to impart rotational movement thereto.

5. In a feed mixing device, a frame, at least two auger housings on said frame, auger shafts rotatably mounted within said auger housings with at least one of their ends extending therefrom, means on said auger housings for introducing feed components therein, a gear on the ends of said auger shafts outside said auger housings, said gears having a plurality of concentric rows of gear teeth, said gears being in lateral alignment with each other, a shaft rotatably secured to said frame in substantial alignment with said gears, spur gears slidably mounted on said shaft and adapted to mesh with one of said rows of teeth on each of said gears, means on said frame for pivoting said shaft away from said gears at times, means on said frame for selectively holding said shaft against pivotal movement at times to hold said spur gears in mesh with said gears, and a power means on said frame operatively connected to said shaft to impart rotational movement thereto.

References Cited in the file of this patent
UNITED STATES PATENTS

| | | |
|---|---|---|
| 999,297 | Carter | Aug. 1, 1911 |
| 1,457,230 | Roubique | May 29, 1923 |
| 1,557,856 | Luebbing | Oct. 20, 1925 |
| 2,926,819 | Burch | Mar. 1, 1960 |